United States Patent [19]

Shetye et al.

[11] Patent Number: 5,444,192
[45] Date of Patent: Aug. 22, 1995

[54] INTERACTIVE DATA ENTRY APPARATUS

[75] Inventors: Mohan S. Shetye, E. Amherst; Paul E. Boden, Blasdell, both of N.Y.

[73] Assignee: Integral Information Systems, Amherst, N.Y.

[21] Appl. No.: 84,472

[22] Filed: Jul. 1, 1993

[51] Int. Cl.6 .............................................. G08C 21/00
[52] U.S. Cl. ...................................................... 178/18
[58] Field of Search ............... 198/18, 19; 364/709.01, 364/709.02, 709.04, 709.11; 341/20, 31, 32, 33; 345/179

[56] References Cited

U.S. PATENT DOCUMENTS

| | | | |
|---|---|---|---|
| 3,395,963 | 8/1968 | Ackerman | 250/569 |
| 4,077,036 | 2/1978 | Avakian et al. | 341/20 |
| 4,295,051 | 10/1981 | Graf et al. | 250/569 |
| 4,475,239 | 10/1984 | Van Raamsdonk | 349/179 |
| 4,628,408 | 12/1986 | Kimura | 361/395 |
| 4,656,317 | 4/1987 | Tusgei et al. | 178/18 |
| 4,725,694 | 2/1988 | Auer et al. | 178/18 |
| 4,773,032 | 9/1988 | Uehara et al. | 364/709.04 |
| 4,866,646 | 9/1989 | Nakamura et al. | 364/709.11 |
| 4,879,557 | 11/1989 | Roche | 341/23 |
| 4,916,441 | 4/1990 | Gombrich | 345/169 |
| 4,916,740 | 4/1990 | Noda et al. | 382/59 |
| 4,991,091 | 2/1991 | Allen | 364/413.02 |
| 5,006,699 | 4/1991 | Felkner et al. | 235/472 |
| 5,049,862 | 9/1991 | Dao et al. | 345/179 |
| 5,065,315 | 11/1991 | Garcia | 364/413.01 |
| 5,077,666 | 12/1991 | Brimm et al. | 364/413.02 |
| 5,171,977 | 12/1992 | Morrison | 235/375 |
| 5,191,329 | 3/1993 | Samreus | 341/20 |

*Primary Examiner*—Stephen Chin
*Assistant Examiner*—Kevin Kim
*Attorney, Agent, or Firm*—Baker & Botts

[57] ABSTRACT

An interactive data entry apparatus to accept, translate, store, and transmit data entered via a paper data entry form and to simultaneously create a written and magnetic or other computer data record. The apparatus has a digitizer upon which a data entry form is placed and a clip which holds the form in place. The digitizer determines the type of form, generates a data entry area corresponding to the form, and accepts check-marks and alpha-numeric data. The apparatus also has a microprocessor for storing appropriate data or commands; a stylus; a display to provide visual feedback of entered data; a speaker to provide audio feedback; batteries and wireless communication device to allow portability; and memory and communication ports to provide additional capabilities including communications with a central processor and enhanced local memory capacity. Commands may be entered or activated in the processor be selecting various function keys through holes in the clip's transparent surface. Further, the apparatus may include an access limiting device to ensure the proper authorship of the data entered.

44 Claims, 7 Drawing Sheets

INTERACTIVE DATA ENTRY APPARATUS

BACKGROUND OF THE INVENTION

1. Field of the Invention

This invention relates to an apparatus for capturing data at its point of creation and in particular to an apparatus for providing data originators with direct control over the entry of data into a magnetic or other computer data recording means and a data processing system. This invention eliminates the need to reenter data collected on printed forms into a computer system. This invention also relates to an apparatus for capturing data which simultaneously creates a magnetic or other computer data record and a written backup copy of the data.

2. Description of the Related Art

Traditionally, certain information, especially medical information, is gathered during a face-to-face encounter with a patient, customer, or client (hereinafter "data providers"). In situations in which a computer may not be desirable or affordable or use of a computer might be intimidating to a data originator, data may be written on a printed form designed for data gathering by the originator. It may then be entered into a computer for storage and processing by members of a data processing staff. Generally, these staff members do not have the same training and background as that of the originator of the data and were not present when the data was gathered. This process of entering or re-recording the data may result in errors, which could lead to mismanagement of the data, as well as financial, e.g., billing or inventory, or legal problems for the originator. This invention is intended to encourage the originators of data to participate directly in the data entry process. Nevertheless, the invention does not require the originators to change their method of conducting business or rendering services. This can increase a business's efficiency, boost profitability, and improve data collection accuracy.

It is recognized that the quality and integrity of computer data generally can be best assured if the data can be entered at the location and at the time at which the data is gathered. Thus, the originator of the record may determine the existence and assess the value of the data at the time it is recorded. Therefore, preferably, information should be entered into the data recording means at the point of collection by the originator. Nevertheless, that originator may be very busy delivering his or her professional services to the data provider(s). Such originators often do not have time to efficiently enter collected data into a computer system themselves with the apparatus and systems presently available.

Nevertheless, originators are generally very concerned about and expend considerable effort to ensure that they document the services that they render. Medical service providers must contend with the additional problem of maintaining control over the distribution of medicines, especially controlled pharmaceuticals and narcotics, and ensuring that improper or dangerous combinations of medicines are not distributed or prescribed. Accurate records, therefore, may have legal importance beyond their importance to patient care. Further, the careful documentation of distributions of medicines and other products is essential to accurate inventory control.

Usually, such originators desire "hardcopy" records. The traditional path for data consists of the recording of data by the originator and communicating the data in written or oral form to a data processing staff member. At this data entry point, the data is interpreted and transcribed by a data entry clerk or secretary, who often has little or no professional training in the matters to which the data pertains. Verification of the entered data may be limited to a cursory review by the person entering the data. The originator often only reviews subsequent printed reports or special system inquiries. Consequently, the originator may not have personal control over the interpretation, translation, or initial verification of entered data. Nevertheless, he or she may remain largely responsible for the accuracy and integrity of the data entries.

Many data originators may also be intimidated by the keyboards, monitors, and processors of related art computer data entry apparatus and systems, or they are concerned with their legal requirement to record data accurately, or both. They may refuse to reenter the same information, which they have already recorded on paper, into the computer, for fear that the data will be entered incorrectly. The present invention allows the originator to enter data directly into the magnetic or other computer data recording means while the "hardcopy" data entry form is being prepared and, thus, eliminates the second step of having supporting staff enter data. Also, unlike many systems which are designed around the keyboard and monitor, a person unfamiliar with computers does not have to first learn to use a keyboard in order to enter data to the apparatus of this invention.

Many attempts have been made to solve the problems stated above, and the attempted solutions that exist today are generally manifested in different models of pen-based computers. See U.S. Pat. No. 5,049,862 to Doa et al.; U.S. Pat. No. 4,991,091 to Allen. Nevertheless, current pen-based systems may limit form size. See U.S. Pat. No. 5,006,699 to Felkner et al. Limited form size requires the use of numerous sub-screens and menus which can be confusing to untrained data originators.

Any interactive data entry apparatus involves entering commands, as well as data. Commands are instructions to the computer which are executed by pressing specific function keys or switches or by typing command codes using an alpha-numeric keyboard. Generally, data may be entered using a keyboard, a stylus, a bar code wand, or a light pen, or the like. Data may be stored permanently while commands are usually transitory and control the immediate flow of the program logic. Therefore, any apparatus used for interactive data collection should be capable of accepting these two kinds of entries. Moreover, the same function key preferably can be used to enter different commands. In screen-oriented, pen-based computers or monitor and keyboard-based computers, this dual function capability may be implemented by software. These functions, however, may be varied with the type of data to be entered. The ability to vary functions allows the originator to implement a different functionality based upon the type of data entry form to be used.

SUMMARY OF THE INVENTION

As noted above, it is an object of this invention that the data originator may simultaneously create a written and magnetic or other computer data record of gathered information. It is a feature of the invention that the originator may have immediate access to review entered data. It is an advantage of the invention that the accuracy and efficiency of data entry is increased. Further, the data provider may benefit from the rapid and accurate recordation and analysis of data.

It is another object of this invention that entered data is almost immediately available to the originator for analysis. Another feature of this invention is that the originator may receive rapid feedback and recommendations from or via the apparatus's processor based on entered data. Moreover, feedback or recommendations may be provided to the originator by aural or visual feedback means. It is an advantage of this invention that because of the interaction between the originator and the apparatus, data gathering may often be more thorough. The originator may even be prompted by the apparatus to explore additional areas based on data already entered, e.g., recognized combinations of medical conditions, such as high blood pressure and diabetes creating a greater danger of retinopathy, or patterns of symptoms, such as shortness of breath and pain in the patient's left arm indicating a possible heart attack.

It is yet another object of the invention to provide an apparatus which even originators that have little or no experience with computers or keyboards will be encouraged to use. It is a feature of this invention that it can be used with numerous forms which are commonly used by various data originators. Thus, there should be little or no "learning curve" because the originators are already familiar with the data entry forms, the steps that are required to complete a given form, and the data requested on the forms. It is a further advantage of this invention that the clipboard-like configuration is familiar to most data originators and data providers.

The present invention is a data collection, analysis, and storage apparatus for simultaneously producing a written and a magnetic or other computer data record. Although the most universally accepted technology for data recording or memory devices is magnetic recording, other technologies, such as laser recording, may also be suitable. The apparatus may comprise a data entry form having data entry spaces and a processor, such as a microprocessor, for receiving and storing a description of the form and commands for manipulating data collection, analysis, and storage. It may further comprise a digitizer for retrieving the description of the form, for generating a data entry area having data entry locations corresponding to the data entry spaces and command selection locations, and for receiving and storing in the processor entries made at the data entry locations. A clip may be attached, e.g., pivotally attached, to the digitizer, such that the clip can hold the form against the data entry area. When the form is held against the data entry area by the clip, the data entry spaces are aligned with the data entry locations.

The clip may comprise an overlay or transparent surface having holes therethrough, such that when the clip holds the form against the data entry area, the holes are aligned with the command selection locations. A template for identifying the command selection locations may also be mounted on the clip. A moveable clip design also permits the use of entire form for originator data entry while maintaining the special functionality of the clip. By implementing the command functions with the clip, it is not necessary to reprint the data entry forms every time the functionalities of the system change. A stylus may be used for selecting the commands by inserting the stylus in the holes and for simultaneously entering data in the form's data entry spaces or at the data entry locations.

In another embodiment, the apparatus may also comprise at least one memory port for linking the apparatus with external devices, including peripherals and add-on memory cards. Further, the apparatus may include communication ports, such as industry standard parallel and serial communication ports and custom configurable communication ports. Moreover, the apparatus may also comprise an access limiting means, such as an access key and key slot, a coded identification card and card reader, or a circuit for identifying a keyed alphanumeric access code. This access limiting means prevents unauthorized persons from entering data or from gaining access to stored data via the processor.

In yet another embodiment, the apparatus may comprise a display that is pivotally mounted on the digitizer. In the alternative or in addition to the display, the apparatus may include an audio reproduction device. This device may comprise a speaker or speakers, a microphone, and sound recordation means to permit the originator to tailor his or her own audio feedback. The apparatus may also comprise a scroll control for visually or aurally reviewing entered data.

The digitizer may be fitted with two or more form orienting posts. The form may have holes therethrough corresponding to the posts for accurately positioning the form on the digitizer. Moreover, optically readable identifying information may also be encoded on the form and the template, so that when the clip is closed, an optical reader for reading and decoding the identifying information and transmitting the information to the digitizer may be activated.

In still another embodiment, the apparatus may comprise a central processor and wireless communication means for transferring commands and entered data between the processor and the central processor. This wireless communication means may include means for transmitting and receiving electromagnetic transmissions, such as infrared (IR) or radio frequency (RF) transmitters and receivers. Further, these communication means may include intermediate terminals or modules for relaying commands or data between the processor and the central processor. Moreover, these means may also be used to transfer commands and data between apparatus.

Various sets of commands and numerous form descriptions may be received and stored in the processor and in view of the capability of wireless communication between the processor and the central processor, large amounts of storage space and data may be rapidly made available to the originator. The digitizer may also be bit mapped, so that each storage position in the processor may be assigned to a physical location on the digitizer data entry area. The digitizer may further comprise means for recognizing hand-printed characters, such as numerals, letters, and symbols.

In another embodiment, the stylus may include a replaceable ink cartridge for entering data in the data entry spaces on the form. Nevertheless, because it may be undesirable to expose the template to the stylus's ink, each of the holes aligned with the command selection locations may be equipped with a ferrule. These ferrules may be made of plastic or other suitable non-conductive material and may be slidably fitted into the holes, such that when the stylus's tip is placed in the ferrule, a data entry signal can be transmitted to the digitizer's data entry area without allowing the tip to contact the data entry area or the template. This prevents ink from the stylus from contacting and fouling the data entry area or the template, yet allows the stylus to make a command selection in the digitizer. A holder for storing the stylus and a cable for securing the stylus to the apparatus and for carrying signals from the stylus to the apparatus may also be included in this embodiment.

Other objects, advantages, and features will be apparent when the detailed description of preferred embodiments of the invention and the drawings are considered.

BRIEF DESCRIPTION OF THE DRAWINGS

The physical and logical layout of the invention may be best illustrated in the following drawings.

DETAILED DESCRIPTION OF PREFERRED EMBODIMENTS

Figure 1:
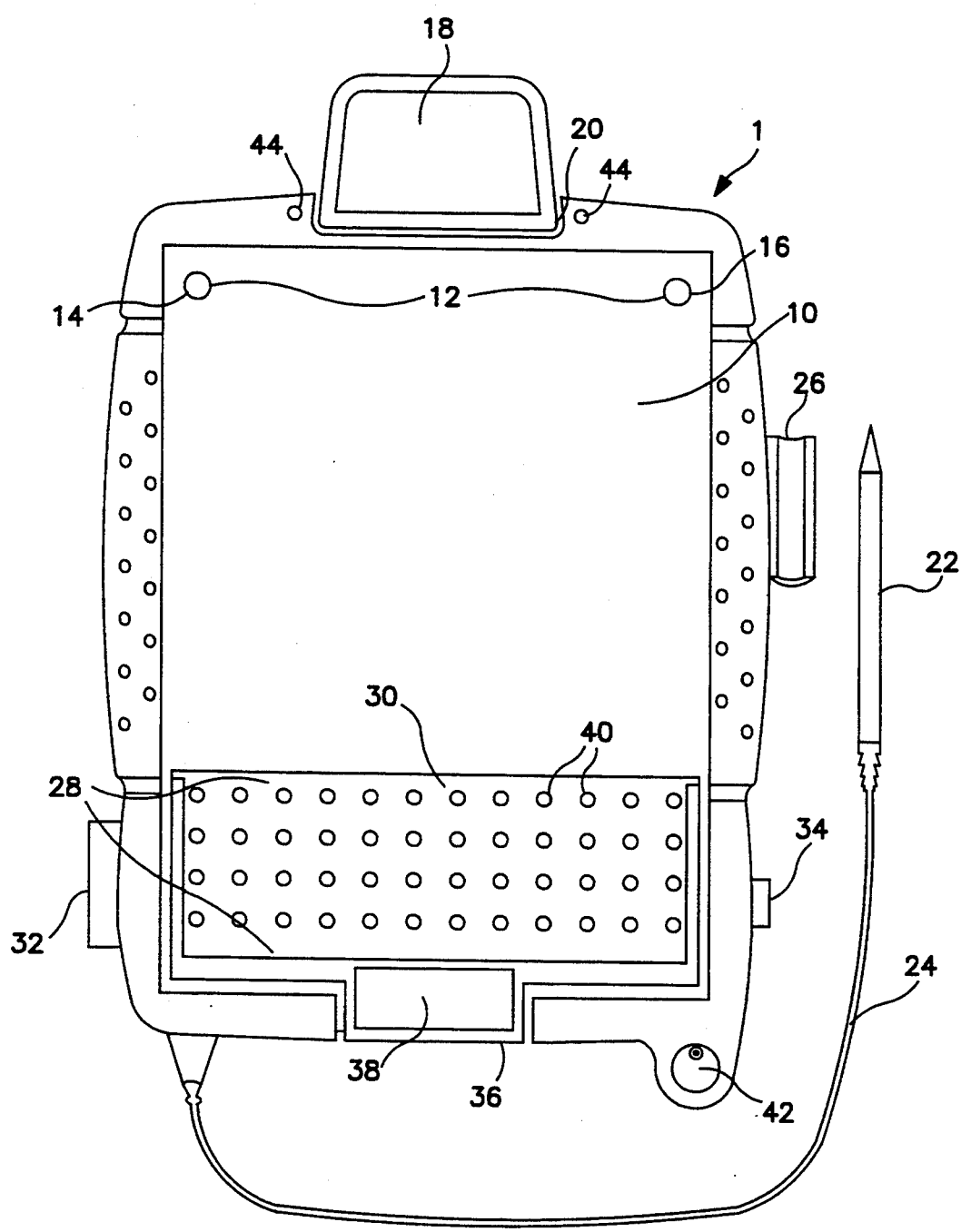
FIG. 1 is a front view of an embodiment of the apparatus with the clip in a down position.

Preferably, this invention is portable, and a preferred embodiment of the apparatus may be only slightly larger than a standard letter-size paper, e.g., about 8½×11. To begin operation, the originator must first satisfy a security access means. This is preferably accomplished by inserting a coded identification card into a card reader. Data may be optically or magnetically encoded on the card, and the card may also carry various other identifying information, such as the originator's identity and the company for which the originator works. It may also carry certain information on the data provider, such as a patient's medical history. The appropriate mode of operation (on-fine or off-fine) is then selected. When the off-fine mode is selected, entered data is stored locally in the processor. In the on-line mode, however, the data is transmitted to the central processor. A data entry form, e.g., a medical encounter form, may then be placed, face-up, on the digitizer. The form is aligned using form orienting posts provided on the digitizer and holes present in the form. The clip is used to further hold the form in place.

After the form is positioned and the clip is closed, the clip uses a photodetector array to optically read digitally encoded information from the form. This information may pertain to a variety of aspects of the form, such as the form number and encounter specific function key information. A data entry area mapping the form is then generated on the digitizer, such that the date entry spaces on the overlying data entry form are aligned with data entry locations on the data entry area. Once the form identification number has been decoded, the template identifying the specific command selection locations on that form may be selected and mounted on the clip.

The data entry form also may contain a prioritized list of commonly gathered data. Items from this fist, such as medical diagnosis or procedures, may be selected by the originator for the efficiency of data entry, and are coded for ease of entry. The originator may then use a computer ball-point refill pen or a stylus, such as a computer-pen equipped with a replaceable ink cartridge, to enter the desired data items, e.g., services rendered or medicines prescribed to a patient. The pen or stylus can be housed in a molded holder fitted to the digitizer when not in use. As the originator marks the appropriate data entry space on the form, the digitizer identifies the data entry location, stores the entered data, e.g., a check-mark or alpha-numeric character, and generates output in various forms for verification by the originator.

This clip further provides command selection locations for the originator to enter commands and alpha-numeric data. The command selection locations are deformed by interchangeable templates which may be mounted on the clip. Moreover, entries can be deleted by simply crossing-out an improper entry on the form. Hand-printed, alpha-numeric entries entered into designated spaces may also be recognized by the digitizer and stored in a local processor or sent to the central processor, or both. The apparatus further may assist in the gathering of correct data by guiding the originator thorough complete and logical data entry.

The apparatus then verifies the originator's entries by providing audio or visual feedback, or both. The apparatus may also generate interactive prompts or "questions," if the local processor or central processor identifies data entered as incomplete, incorrect, or inconsistent. Audio verification is broadcast through a speaker or speakers. The originator may select the author of the prerecorded audio responses, and these responses may be recorded on a microphone in the apparatus. In addition to the audio feedback, visual verification can be accomplished on a video display by reviewing entered data.

Referring to FIG. 1, the apparatus 1 may have a digitizer 10 with a surface that is about 8½ inches by about 11 inches for placement of a pre-printed data entry form. See FIG. 2. The form may be positioned properly by two form orienting posts 12 and held in place by a clip 28. Digitizer 10 can employ a wide variety of known digitizer technology, such as capacitively-coupled or resistive digitizers. The output of digitizer 10 may be processed by a local processor, such as a microprocessor, which correctly interprets the entries based on the data entry form. Further, digitizer 10 may have sufficient entry resolution to capture hand-printed entries, such as signatures and phrases and short sentences. The form may include optically readable identification codes, and it may be automatically identified upon closure of clip 28. See FIG. 3. This identification process is described in greater detail below.

Apparatus 1 may also contain memory or data recording means to record entered data and commands. Apparatus 1 also may allow downloading of microprocessor instruction codes from a central processor to allow apparatus 1 to be reprogrammed to use new forms and new commands. The memory can be of any common type, including flash memory, which allows downloaded code to be saved even when power is removed from apparatus 1. Apparatus 1 may further contain an access limiting device 34, such as an access key and key slot or a magnetically or optically coded identification card and card reader, to prevent unauthorized use of or access to entered data.

When capturing information from a form, the microprocessor may utilize a mapping of potentially active data entry and command selection locations. A stylus 22 with a ball-point pen ink cartridge may be used to enter data to digitizer 10. Stylus 22 may be attached to apparatus 1 by a cable 24. Stylus 22 may also contain a switch mechanism which is actuated when the originator writes on digitizer 10. The switch sends an electronic signal to the microprocessor via cable 24 indicating that a valid entry is being made. Because valid entries may only be received upon activation of this switch, apparatus 1 and the microprocessor can enter a standby mode until such a signal from stylus 22 is received, thus conserving battery power. Further, apparatus 1 may be fitted with a housing 26 for holding or stowing stylus 22 when not in use.

Apparatus 1 may also have a display 18 which provides an originator with visual feedback, such as by echoing entered data, updating status, and displaying requested information. Display 18 can display text and characters, or it may produce graphic presentations or icons, and may employ currently known technologies, such as a cathode ray tube (CRT) or a liquid crystal displays (LCD). The information shown on display 18 is controlled by the microprocessor. In addition to feedback of selected entries, display 18 can display entry options to the originator, such as the fist of allowed county codes, discussed above. Further, display 18 has a hinge 20 which allows display 18 to be pivoted in order to achieve improved viewing angles and to reduce glare or for ease of transportation. This feature further permits apparatus 1 to be modified to include various sizes and types of display 18 to meet differing originator needs.

A scroll control 42 may also be added to apparatus 1 to allow easy selection of desired data from groups of data entries too long to be reviewed on a single screen presentation by display 18. Scroll control 42 located at the bottom of apparatus 1 allows the originator to scroll through the data/menu options. When not being used, scroll control 42 sits in a neutral or centered position. It can be turned left or right using stylus 22. When turned to the left or right, the fist or menu is scrolled up or down, respectively. The farther that scroll control 42 is turned from the neutral position, the faster the entries scroll. Additional visual originator feedback is provided by status LEDs 44 or other small visual indicators which can indicate apparatus status, such as whether apparatus 1 is on-line or off-fine with the central processor or battery low power indications.

Apparatus 1 may also contain wireless communication means, such as an infrared (IR) link or radio frequency (RF) link. Either of these means would be known and understood by a person of ordinary skill in the art and will not be discussed in greater detail herein. In the embodiment depicted in FIG. 1, an IR transmitting port 14 and an IR receiving port 16 are incorporated into form orienting posts 12. This wireless communication capability along with the use of a battery or batteries as a power source permits apparatus 1 to be completely portable and still allows the originator to interact with the central processor. This interaction permits locally entered data to be sent to the central processor for recording and analysis. It also permits the originator to locally access peripheral devices attached to the central processor. Further, communication with other originators who are in communication with the central processor is possible.

Electronic photo-emitter/detection unit 38 of clip 28 may also employ known technologies and might comprise fight emitters, such as LEDs, generating signals received by discrete photo-diodes or arrays of photo-diodes. Alternatively, a charged coupled device (CCD) sensor array could be used as the photo-detector to read high density optical codes from data entry forms. As will be discussed below, similar optically readable identification codes may also be imprinted on and read from templates, such as template 3 depicted in FIG. 5. Sensors, such as optical sensors, are included which detect clip 28 opening and closing to allow automatic form and template identification by clip 28 closure. Further, the photoemitters are under the control of the microprocessor, and the data from the photo-receivers is supplied to the microprocessor for decoding and interpretation. The decoded information indicates the type of form being used and allows the microprocessor to align the form's data entry spaces with data entry locations and, where appropriate, to interpret entries as alphanumeric characters or hand-printed entries, such as an alpha-numeric code, to be digitized, bit mapped, and recorded. Also, the type of template mounted on clip 28 can be determined, thus, allowing the microprocessor to respond to data or commands entered via clip 28.

Figure 2:
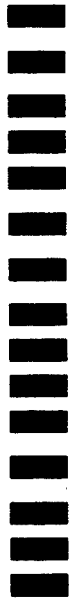
FIG. 2 is a partial sample data entry form with an optically readable identification code.

A sample data entry form is depicted in FIG. 2. Essentially, form 2 comprises lines of text, such as "2. Cells," 50. Each fine of text may be associated with the outline of a data entry space. In this case, a data entry space 52 is a square box to the left of line of text 50. Using stylus 22 to make a mark in space 52 selects that line of text for recordation. The microprocessor having detected this stylus entry accesses its internal map and determines that the originator has accessed the data entry space associated with line of text 50. Therefore, fine of text 50 is recorded in the local processor, i.e., the microprocessor, or sent to the central processor, or both. Further, a selected item can be deleted by simply drawing a fine through the previously selected line of text. Again, the local processor accesses its internal map to identify and delete the entry, and if necessary, it instructs the central processor to delete the entry as well.

As an example of the entry of hand-printed data, an alpha-numeric data entry space near the upper right corner of form 2 labeled "Enter County Code From List" 56 is shown which allows an alpha-numeric code to be written in this space. When such an entry is made the microprocessor accesses its map for this data entry form and processes the entry with a character recognition routine implemented in the microprocessor's instruction code. The recognized characters then may be stored in the microprocessor or sent to the central processor. The forms may also contain a region for free-form written entries, such as a signature space 54. Entries written in this area may be digitized and recorded for later viewing just as they were entered.

Figure 8:
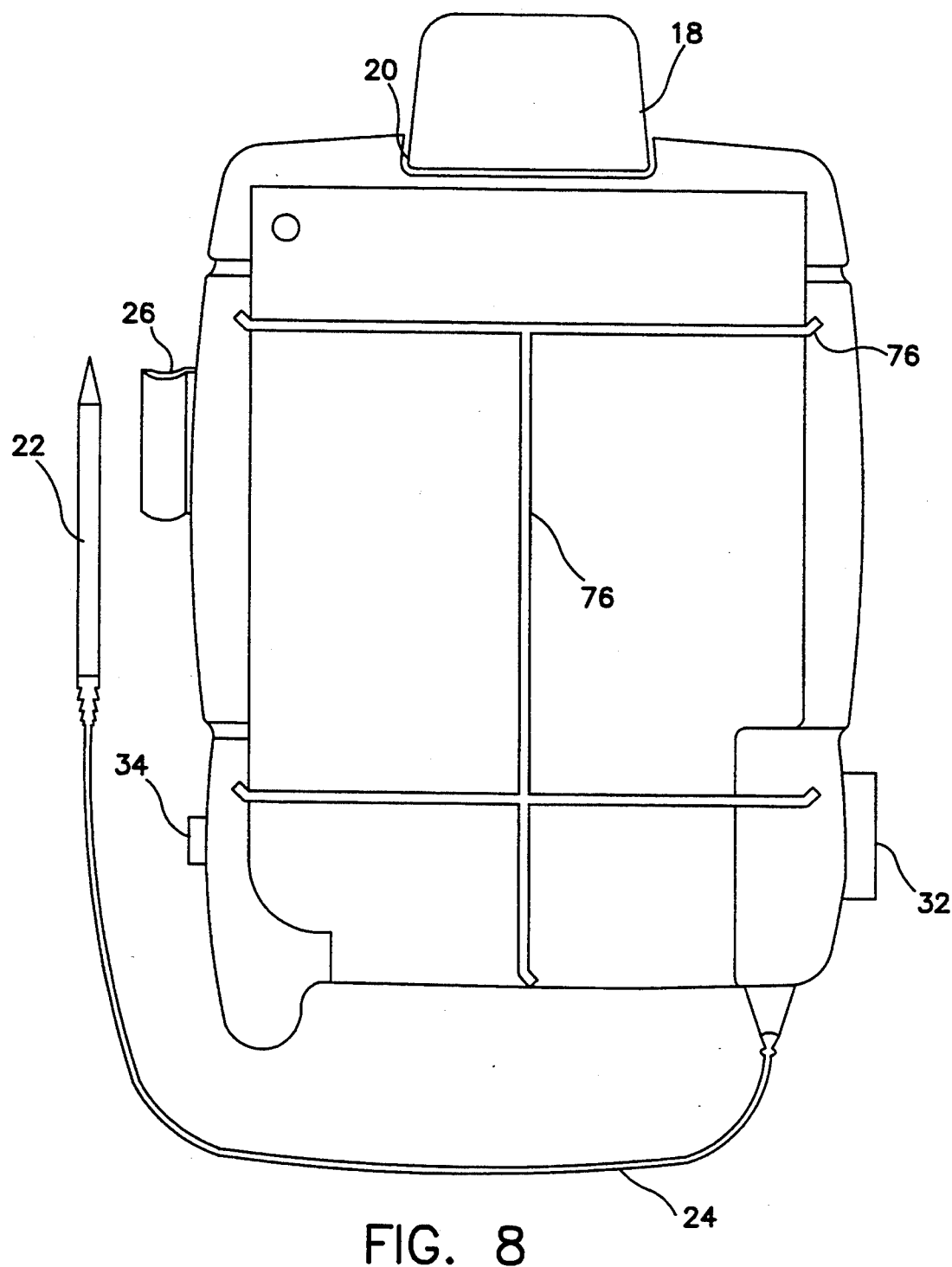
FIG. 8 is a rear view of an embodiment of the apparatus depicting a data entry form holder bracket.

Another feature of form 2 is an optically readable identification code 58 printed along the bottom of form 2. As described above, code 58 is used by apparatus 1 to access information about form 2 to be used by the microprocessor in properly interpreting entries. Moreover, additional information for form 2, such as patient information in a medical application, can also be included in this optically encoded information. For convenience to the originator, a form holder 76 may also be located on the rear of the apparatus, as shown in FIG. 8.

Figure 3:
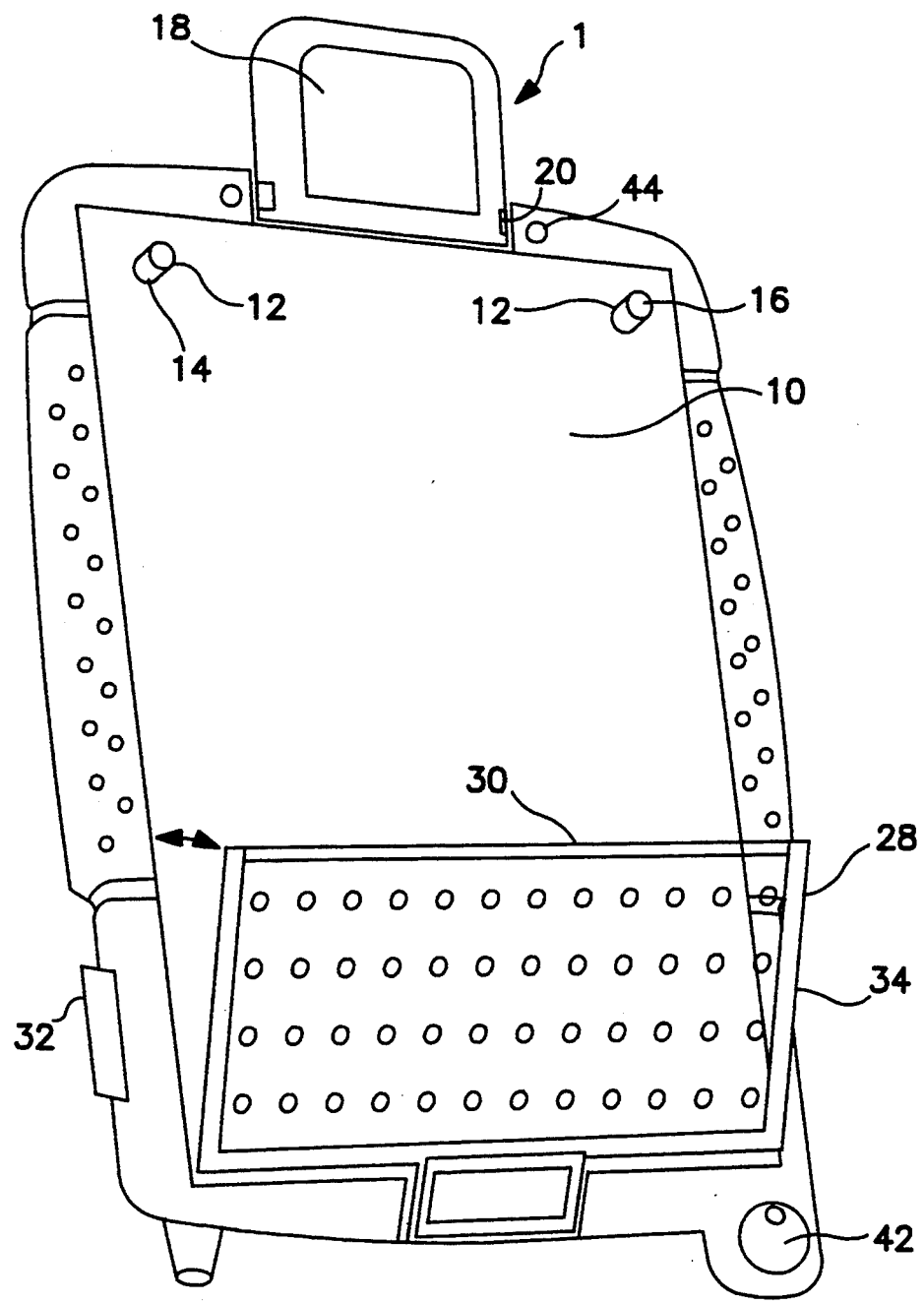
FIG. 3 is a perspective a view of an embodiment of the apparatus with the clip in the open position.
Figure 4:
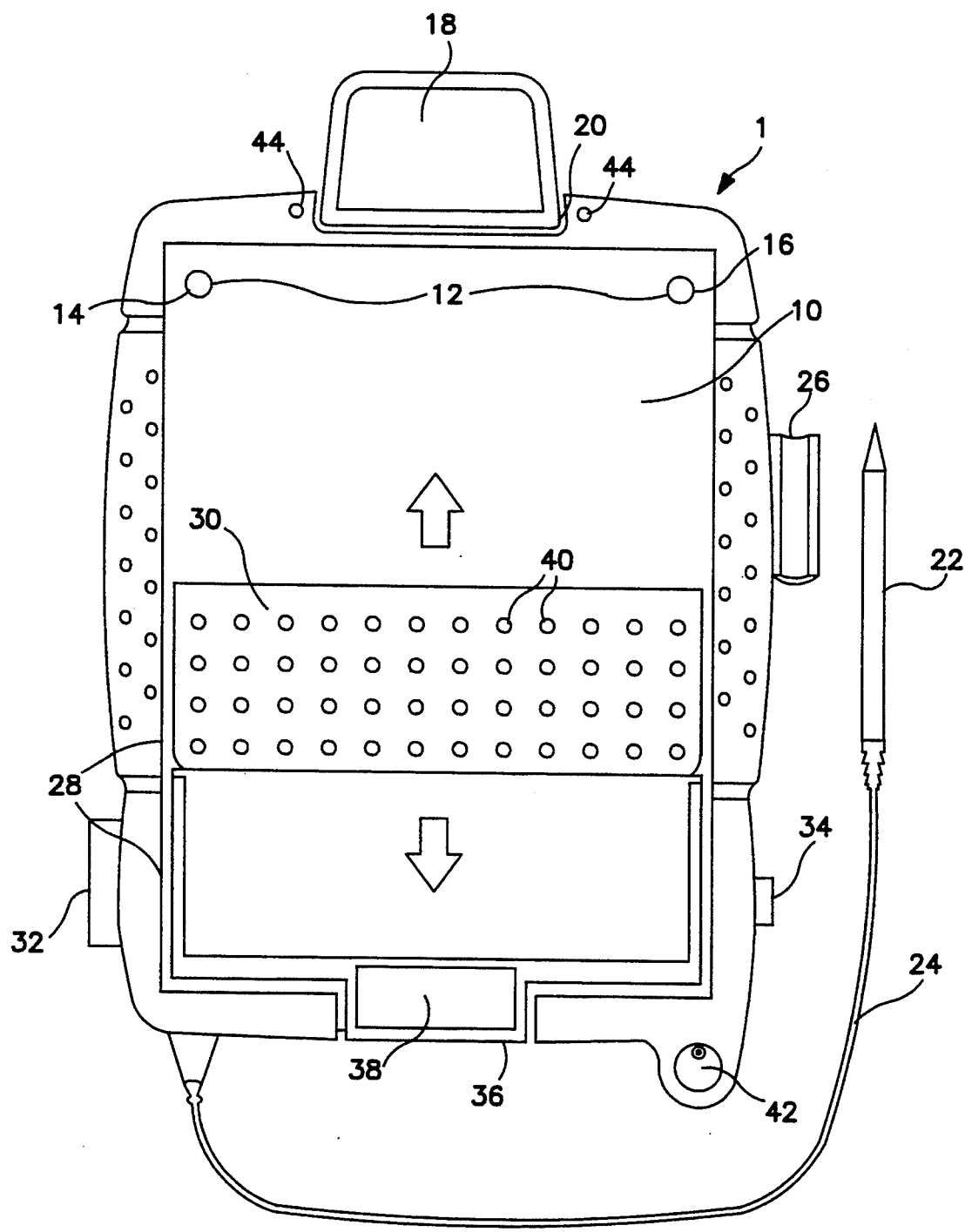
FIG. 4 is a front view of an embodiment of the apparatus with the clip in the up position.
Figure 5:
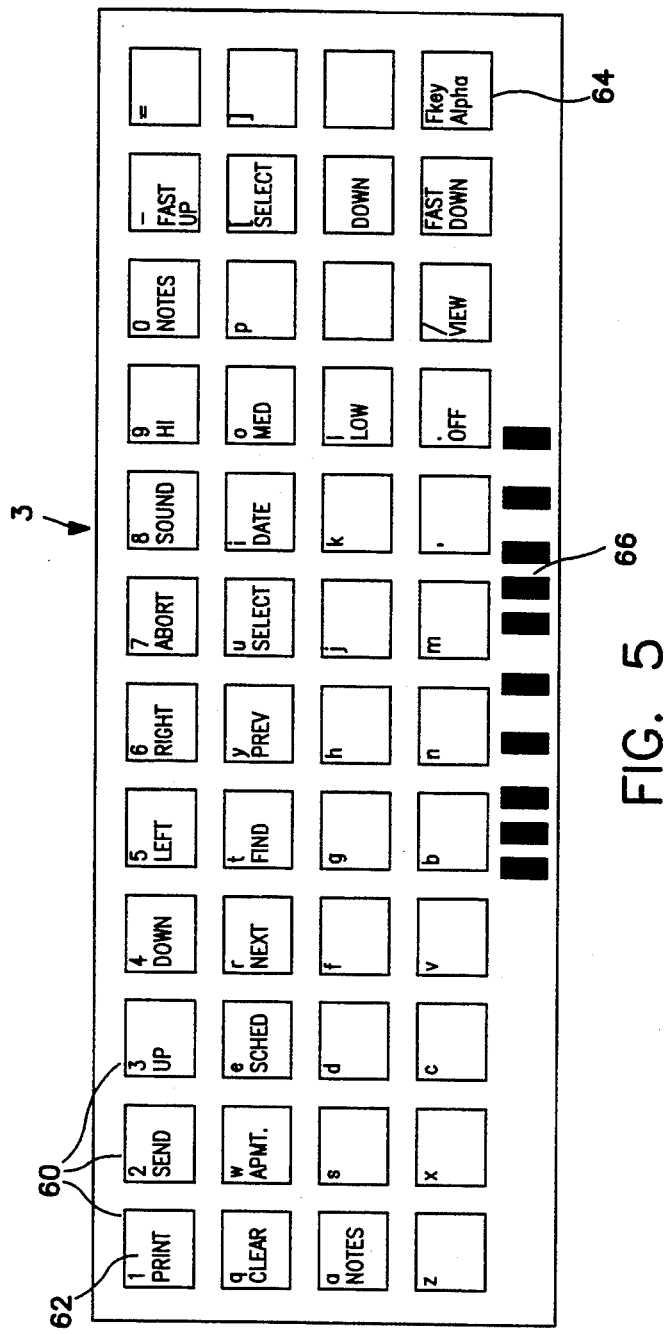
FIG. 5 is a sample command template with an optically readable identification code.

As can be seen by referring to FIG. 4, clip 28 may be comprised of several individual components. Among these components are photo-emitter/detection unit 38 and a transparent surface 30 with holes 40 to accept the tip of stylus 22. Also, transparent surface 30 of clip 28 may be configured, so that a template 3, which is depicted in FIG. 5, may be mounted on clip 28. Template 3 identifies alpha-numeric function keys 62 associated with form 2. A template optical identification code 66 may be used to identify template 3 for the microprocessor and to allow the microprocessor to determine if the appropriate template has been mounted. A hinge 36 allows clip 28 to be pivoted open, so that forms may be placed upon the digitizer's surface, and templates may be mounted, as depicted in FIG. 3. It also includes a mechanical means for moving transparent surface 30 of the clip 28 up, so that data may be entered on the lower portions of the data entry form. As indicated by the arrows in FIG. 4, clip 28 may move slidably across the surface of digitizer 10, thereby exposing the lower portions of the data entry form. This allows the entire form to be used for data entry.

Referring to FIG. 4, each of holes 40 in transparent surface 30 may be equipped with a ferrule (not shown). Ferrules may be slidably fitted into holes 40, so that when the tip of stylus 22 contacts or is inserted into the upper end of a ferrule, stylus 22 causes a data entry signal to be transmitted through template 3 to digitizer 10. The signals may be transmitted to digitizer 10 by various means, including pressure exerted through the ferrule or by the proximity of the stylus 22 to digitizer 10 when the stylus's tip contacts or is inserted into the ferrule. Preferably, ferrules may be manufactured from plastic or other non-conducting materials. Because stylus 22 contacts or is inserted into the ferrule, the stylus switch is activated, and the electronic signal is sent to the microprocessor to indicate that a valid data entry or command is being made. Nevertheless, the stylus's tip is prevented from contacting template 3 or digitizer 10 and, therefore, neither template 3 nor digitizer 10 is fouled with ink from stylus 22.

An example of a template is depicted in FIG. 5. Each command selection location 60 may be associated with an alpha-numeric function key 62 which may be selected by the originator. Function keys 62 may represent a single alpha-numeric character or a word or function. This allows the originator to enter both alpha-numeric text or function commands. Alternatively, template 3 may identify dual purpose toggle keys. These keys allow the originator to shift between two modes of entry or operation. As an example, a toggle key in the lower right-hand corner of template 3 labeled Fkey/Alpha 64 toggles between entry modes. Template optical identification code 66, which is automatically sensed by apparatus 1 when clip 28 closes, may also included on template 3. Means for identifying template 3 are necessary because the commands are application dependent. New commands can be tailored for a particular application by preparing a new template and loading the proper instructions to the microprocessor.

Figure 6:
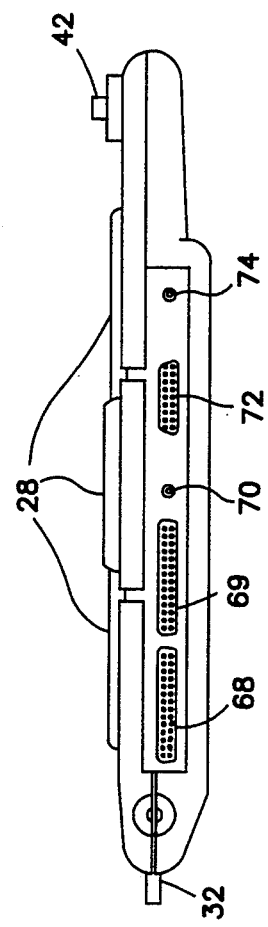
FIG. 6 is a bottom view of an embodiment of the apparatus depicting various communication ports.

As depicted in FIG. 6, apparatus 1 may contain one or more memory ports, such as one or more memory or peripheral card slots 32. Slot 32 may be in an industry standard format, such as a PCMCIA slot. When slot 32 is used for additional memory, memory cards permit extended data acquisition or permit the originator to access information previously downloaded from the central processor. Moreover, slot 32 can be used for peripherals, such as a modem which would permit remote access to the central processor. Additionally, apparatus 1 may contain a plurality of additional communication ports. For example, standard serial communication ports 69, such as RS232 ports, can be included. Serial links would allow communication with apparatus and systems which are not capable of a wireless interface. Also, serial links could be used to allow originators to communicate through external modems. Further, parallel communication ports 68, e.g., IEEE 488 and SCSI ports, or custom configurable communication ports 72 can be included in apparatus 1. Ports 68 could include an industry standard, parallel printer port which would allow the originator to order a printout (at a printer (not shown)) of a summary of entered data directly from apparatus 1.

It is also envisioned that apparatus 1 could contain an input port 74 for a bar code wand (not shown) to allow the originator to capture bar coded information from the data entry form. A bar code wand could be especially useful for tracking inventory or, possibly, for dispensing medicine. The bar code reader wand and the memory and communication ports described above may also be controlled by and allow communication with the microprocessor. These ports may be used to rapidly update the commands and the instruction code stored on the microprocessor or to down load data from the microprocessor.

Apparatus 1 may also have a local power source, such as internal batteries, which may be used in conjunction with the wireless communication ports to permit completely portable operation. An input port 70, see FIG. 6, from an AC power adaptor can be used to charge the batteries and allow continued operation of apparatus 1 if the batteries are low or removed.

To provide audio feedback and allow interactive voice communications, this apparatus can include a speaker or speakers and a microphone. The audio feedback can range from simple clicks as data entry or command selection locations are accessed to spoken feedback echoing entered data or giving instructions. It is envisioned that the amount of audio feedback can be determined by the originator through clip functions. Apparatus 1 may also allow the originator to dictate voice messages which may be captured and recorded at the local processor or sent to the central processor, or both. Apparatus 1 may employ known speech compression technology to allow greater amounts of recording space for speech in available memory and to reduce the bandwidth requirements for sending digitized speech to the central processor.

Figure 7:
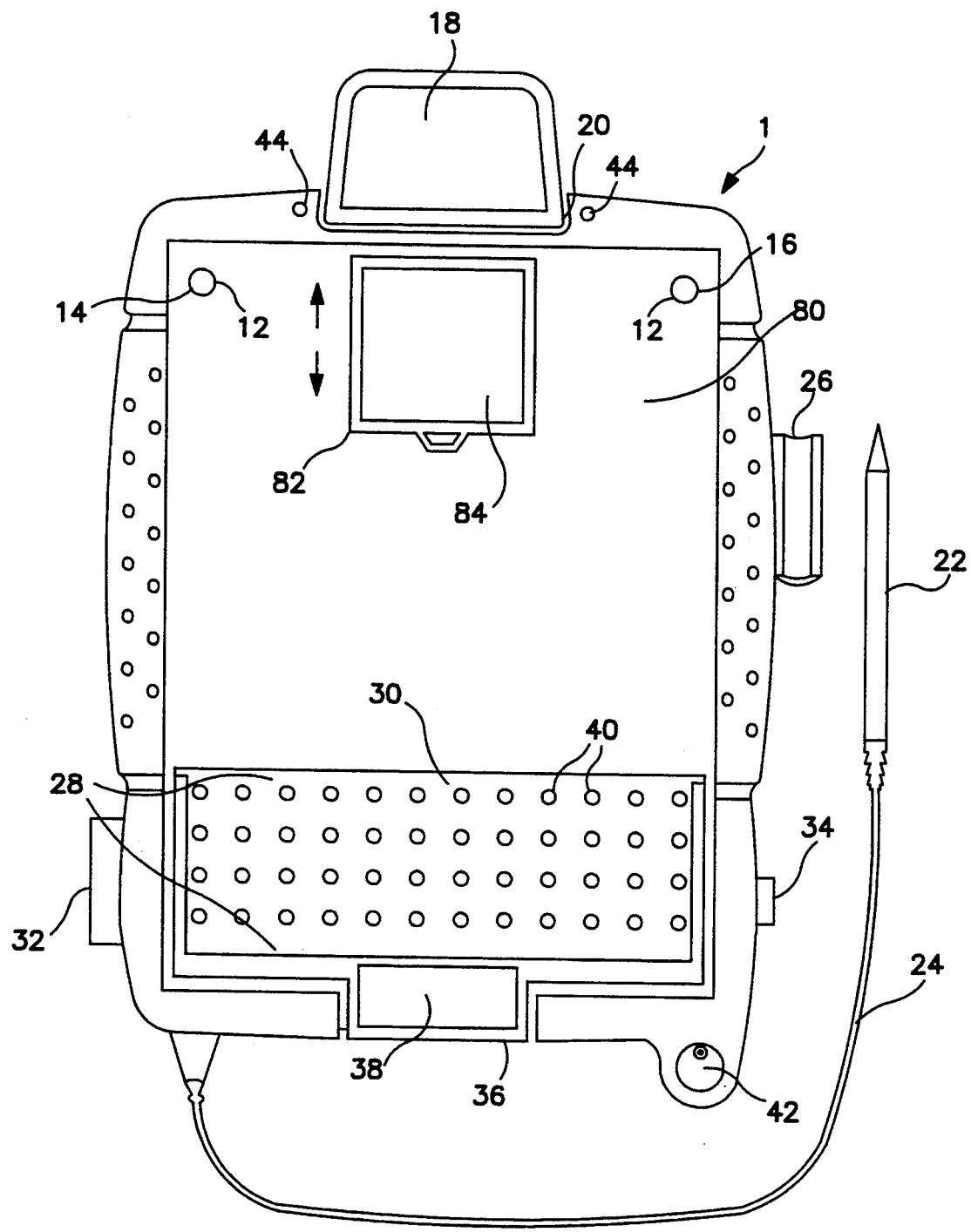
FIG. 7 is a front view of an embodiment of the apparatus depicting a self-stick removable note holder in the open position.

The same bit mapping technique described with respect to FIG. 2 can also be applied to an area of a digitizer 80 onto which a self-stick removable note 84 can be placed. Such notes may be small rectangular sheets of paper presenting one side for recording information and having a strip of weakly binding adhesive along the upper portion of the reverse side, e.g., Post-It ™ or Highland ™ notes which are manufactured by the 3M Company of St. Paul, Minn. See FIG. 7. This area can cover the normal forms portion of the apparatus and can be toggled as a bit map or standard data form entry area by virtue of a clip function. Bit mapping is a process involving the assignment of each position in a processor's recording area to a physical location on a display or, in this case, to the digitizer's data entry area. A command function could activate a predetermined area outlined on digitizer 80. Alternatively, the area could be activated automatically by a sensor attached to the slidable note holding device 82. After capture, removable note 84 can be placed anywhere on form 2, but the entered data would then be recorded as a bit map entry to the data entry form.

Although a detailed description of the present invention has been provided above, it is to be understood that the scope of the invention is not to be limited thereby, but is to be determined by the claims which follow.

The invention claimed is:

1. A data collection, analysis, and recording apparatus for simultaneously producing a written and a computer data record comprising:
   a data entry form having data entry spaces;
   a processor for receiving and recording a description of said form and commands for manipulating data collection, analysis, and recording;
   a digitizer for retrieving said description of said form, for generating a data entry area having data entry locations corresponding to said data entry spaces and command selection locations, and for receiving and recording in said processor, entries made at said data entry locations;
   a clip attached to said digitizer, such that said clip can to hold said form against said data entry area, whereby said data entry spaces are aligned with said data entry locations, and comprising an overlay having holes therethrough, such that when said clip holds said form against said data entry area, said holes are aligned with said command selection locations;
   a template, mounted on said clip, for identifying said command selection locations; and
   a stylus for selecting said commands by inserting said stylus in said holes and for simultaneously entering data in said spaces and at said data entry locations.

2. The apparatus of claim 1 wherein said clip is pivotally attached to said digitizer, such that said clip can be pivoted to hold said form against said data entry area.

3. The apparatus of claim 1 further comprising at least one electronic communication port for linking said apparatus with external devices.

4. The apparatus of claim 3 further comprising an access limiting means connected to said digitizer to permit said processor to receive and record said entries made at said data entry locations.

5. The apparatus of claim 4 further comprising a display pivotally mounted on said digitizer.

6. The apparatus of claim 4 wherein optically readable identifying information is encoded on said form and said template and said clip further comprises an optical reader for reading and decoding said information and transmitting said information to said digitizer.

7. The apparatus of claim 3 further comprising a display pivotally mounted on said digitizer.

8. The apparatus of claim 7 wherein optically readable identifying information is encoded on said form and said template and said clip further comprises an optical reader for reading and decoding said information and transmitting said information to said digitizer.

9. The apparatus of claim 3 wherein optically readable identifying information is encoded on said form and said template and said clip further comprises an optical reader for reading and decoding said information and transmitting said information to said digitizer.

10. The apparatus of claim 3 wherein said digitizer is fitted with two or more form orienting posts and said form has holes therethrough corresponding to said posts for accurately positioning said form.

11. The apparatus of claim 1 further comprising an access limiting means connected to said digitizer to permit said processor to receive and record said entries made at said data entry locations.

12. The apparatus of claim 11 further comprising a display pivotally mounted on said digitizer.

13. The apparatus of claim 12 further comprising a scroll control for visually reviewing entered data.

14. The apparatus of claim 11 wherein optically readable identifying information is encoded on said form and said template and said clip further comprises an optical reader for reading and decoding said information and transmitting said information to said digitizer.

15. The apparatus of claim 11 further comprising an audio reproduction device connected to said digitizer for recording audio feedback to and retrieving audio feedback from said processor.

16. The apparatus of claim 15 further comprising a scroll control for aurally reviewing entered dam.

17. The apparatus of claim 1 further comprising a display pivotally mounted on said digitizer.

18. The apparatus of claim 17 wherein optically readable identifying information is encoded on said form and said template and said clip further comprises an optical reader for reading and decoding said information and transmitting said information to said digitizer.

19. The apparatus of claim 17 further comprising a scroll control for visually reviewing entered data.

20. The apparatus of claim 1 wherein optically readable identifying information is encoded on said form and said template and said clip further comprises an optical reader for reading and decoding said information and transmitting said information to said digitizer.

21. The apparatus of claim 20 wherein said digitizer is fitted with two or more form orienting posts and said form has holes therethrough corresponding to said posts for accurately positioning said form.

22. The apparatus of claim 1 wherein said digitizer is fitted with two or more form orienting posts and said form has holes therethrough corresponding to said posts for accurately positioning said form.

23. The apparatus of claim 22 further comprising a central processor and wireless communication means for transferring said commands and said entered data between said processor and said central processor.

24. The apparatus of claim 1 further comprising an audio reproduction device connected to said digitizer for recording audio feedback to and retrieving audio feedback from said processor.

25. The apparatus of claim 24 further comprising a scroll control for aurally reviewing entered data.

26. The apparatus of claim 1 further comprising a central processor and wireless communication means for transferring said commands and said entered data between said processor and said central processor.

27. The apparatus of claim 1 wherein each recording position in the processor is assigned to said locations on said data entry area.

28. The apparatus of claim 27 wherein said digitizer further comprises means for recognizing hand-printed characters.

29. The apparatus of claim 1 wherein said digitizer further comprises means for recognizing hand-printed characters.

30. A data collection, analysis, and recording apparatus for simultaneously producing a written and a magnetic data record comprising:

a data entry form having data entry spaces;

a local processor for receiving and recording a description of said form and commands for manipulating data collection, analysis, and recording;

a digitizer for retrieving said description of said form, for generating a data entry area having data entry locations corresponding to said data entry spaces and command selection locations, and for receiving and recording in said processor, data entered at said data entry locations;

a clip attached to said digitizer, such that said clip can hold said form against said data entry area, whereby said data entry spaces are aligned with said data entry locations, and comprising an overlay having holes therethrough, such that when said clip holds said form against said data entry area, said holes are aligned with said command selection locations;

a template, mounted on said clip, for identifying said command selection locations;

a stylus for selecting said commands by inserting said stylus in said holes and for simultaneously entering data in said spaces and at said data entry locations;

a central processor; and means for transferring said commands and said entered data between said local processor and said central processor.

31. The apparatus of claim 30 wherein said clip is pivotally attached to said digitizer, such that said clip can be pivoted to hold said form against said data entry area.

32. The apparatus of claim 30 further comprising at least one electronic communication port for linking said apparatus with external devices.

33. The apparatus of claim 30 further comprising an access limiting means connected to said digitizer to permit at least one of said processors to receive and record said entries made at said data entry locations.

34. The apparatus of claim 30 further comprising a display pivotally mounted on said digitizer.

35. The apparatus of claim 30 wherein optically readable identifying information is encoded on said form and said template and said clip further comprises an optical reader for reading and decoding said information and transmitting said information to said digitizer.

36. The apparatus of claim 30 wherein said digitizer is fitted with two or more form orienting posts and said form has holes therethrough corresponding to said posts for accurately positioning said form.

37. The apparatus of claim 30 wherein each storage position in the processor is assigned to said locations on said data entry area.

38. The apparatus of claim 37 wherein said digitizer further comprises means for recognizing hand-printed characters.

39. A data collection, analysis, and recording apparatus for simultaneously producing a written and a magnetic data record comprising:

a data entry form having data entry spaces and optically readable identifying information is encoded on said form;

a microprocessor for receiving and recording a description of said form and commands for manipulating data collection, analysis, and recording;

a digitizer for retrieving said description of said form, for generating a data entry area having data entry locations corresponding to said data entry spaces and command selection locations, and for receiving and recording in said microprocessor, entries made at said data entry locations;

a clip pivotally attached to said digitizer, such that said clip can be pivoted to hold said form against said data entry area, whereby said data entry spaces are aligned with said data entry locations, and comprising an overlay having holes therethrough, such that when said clip holds said form against said data entry area, said holes are aligned with said command selection locations and wherein each of said holes is fitted with a ferrule;

a template, mounted on said clip, for identifying said command selection locations and having optically readable identifying information encoded on said template;

an optical reader, mounted on said clip, for reading and decoding said optically readable information encoded on said form and said clip and transmitting said information to said digitizer;

at least one communication port for linking said apparatus with external devices;

a stylus with a replaceable ink cartridge for selecting said commands by inserting said stylus in said holes and for simultaneously entering data in said spaces and at said data entry locations;

a holder for storing said stylus and a cable for securing said stylus to said apparatus.

40. The apparatus of claim 39 further comprising a central processor and wireless communication means for transferring said commands and said entered data between said microprocessor and said central processor.

41. The apparatus of claim 15, wherein said audio reproduction device includes at least one speaker, a microphone, and sound recordation means, for tailoring audio feedback.

42. The apparatus of claim 24, wherein said audio reproduction device includes at least one speaker, a microphone, and sound recordation means, for tailoring audio feedback.

43. The apparatus of claim 1, wherein said data entry form has bar coded information and further comprising a bar code wand to capture said bar coded information and at least one input port for placing said wand in communication with said processor.

44. The apparatus of claim 30, wherein said data entry form has bar coded information and further comprising a bar code wand to capture said bar coded information and at least one input port for placing said wand in communication with said processor.

* * * * *